Figure 1:
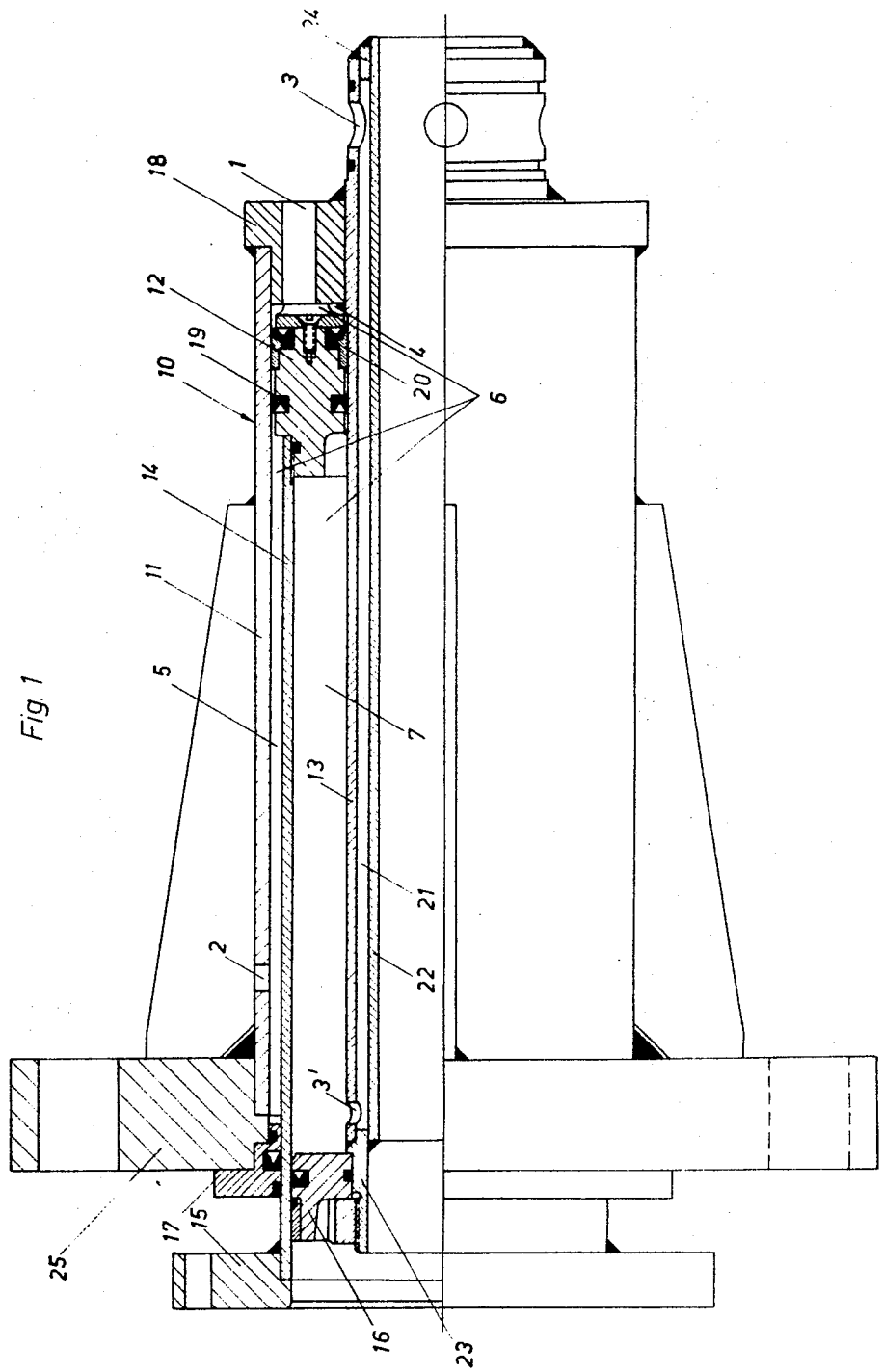

United States Patent

[11] 3,596,561

| [72] | Inventor | Heinrich Keller |
| | | Bad Oeynhausen, Germany |
| [21] | Appl. No. | 789,909 |
| [22] | Filed | Jan. 8, 1969 |
| [45] | Patented | Aug. 3, 1971 |
| [73] | Assignee | Stubbe Maschinenfabrik G.m.b.H. |
| | | Kalletal-Kalldorf, Germany |
| [32] | Priority | Mar. 23, 1966 |
| [33] | | Germany |
| [31] | | P 15 79 043.9 |
| | | Continuation-in-part of application Ser. No. |
| | | 623,427, Mar. 15, 1967, now abandoned. |

[54] HYDRAULIC CLAMPING ARRANGEMENTS FOR INJECTION MOULDING MACHINES
4 Claims, 2 Drawing Figs.

[52] U.S. Cl. .................................................. 91/20,
91/32, 91/436, 91/447, 91/448, 92/108
[51] Int. Cl. ........................................................ F01b 25/04,
F15b 11/08, F15b 13/044
[50] Field of Search............................................. 92/108;
91/20, 32, 436, 447, 448

[56] References Cited
UNITED STATES PATENTS
3,452,397  7/1969  Newton.......................... 92/108

*Primary Examiner*—Paul E. Maslousky
*Attorney*—Watson, Cole, Grindle and Watson ABSTRACT: A mold-clamping plate is attached to one end of a tubular piston rod the other end of which is attached to an annular piston. The piston is slidably mounted in an outer cylinder and surrounds a concentric inner cylinder along which it is slidable. Hydraulic pressure applied to the full area face of the piston moves the clamping plate to a clamping position. Hydraulic pressure applied to the annular face of the piston via the space between the piston rod and the outer cylinder moves the clamping plate to a nonclamping position and during this movement oil is transferred from the full-face side of the piston to the space between the piston rod and the inner cylinder, being returned during the next clamping stroke of the piston. Feed and transfer of oil is controlled by hydraulic flow control valves operated under control of electrical switches.

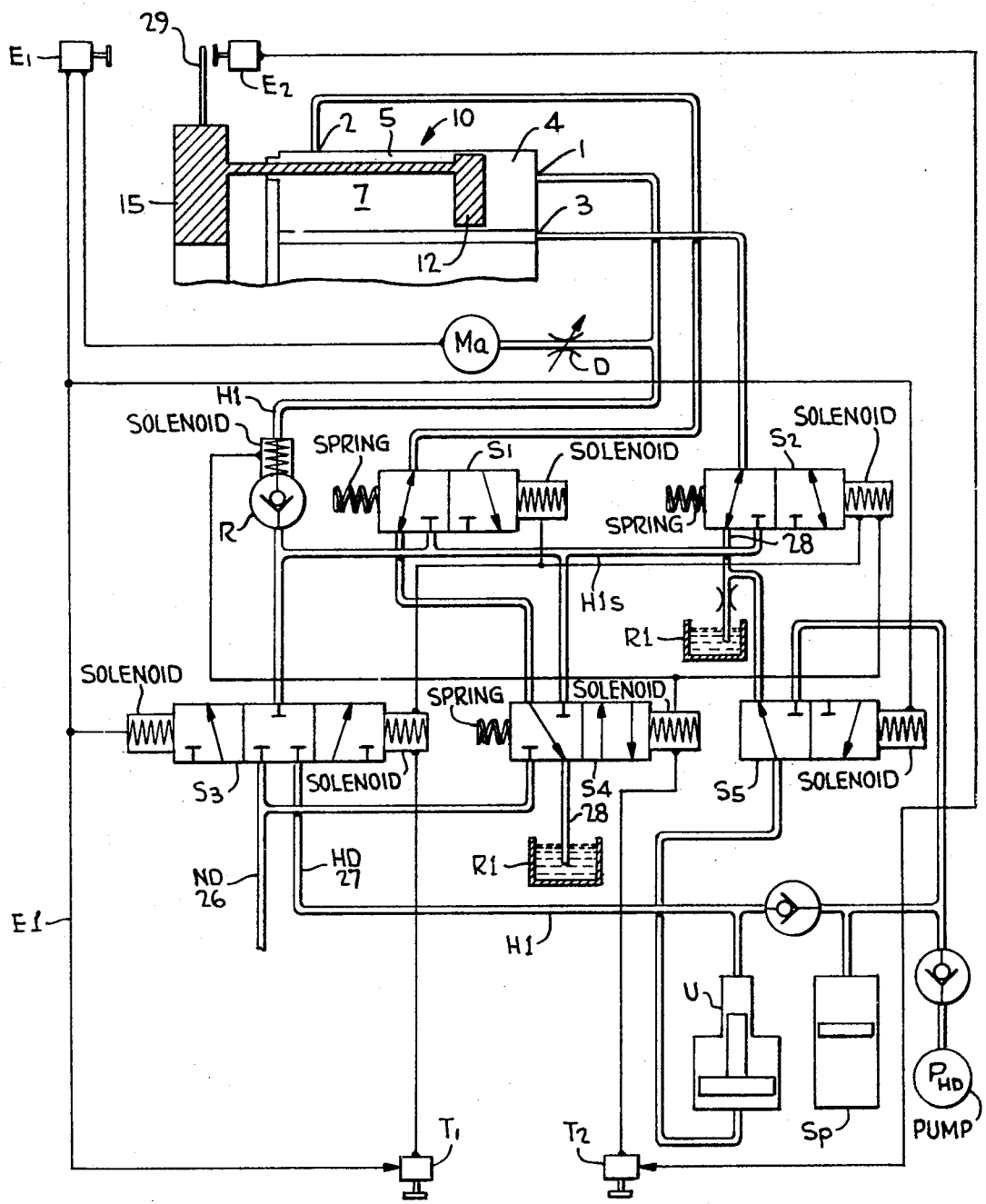

HYDRAULIC CLAMPING ARRANGEMENTS FOR INJECTION MOULDING MACHINES

This application is a Continuation-In-Part of Applicant's copending application Ser. No. 623,427, filed Mar. 15, 1967, now abandoned.

The invention relates to a hydraulic mold closing device for injection molding machines with a locally fixed support plate and a movable clamping plate. The hydraulic cylinder of the mold closing device during opening and closing of the injection mold moves the movable clamping plate of the mold back and forth and at a closed mold it creates the mold closing pressure with which the two half molds are pressed against each other.

In order to achieve high performance of the injection molding machines one will, on the one hand, try to carry out the previously mentioned movement processes as rapidly as possible, in as short a time as possible and with a minimum of energy expenditure and technical effort. Cylinder spaces with small cross sections met this requirement, so that the filling volume of the cylinder spaces, the amount of hydraulic liquid that is to be introduced into the pressure space of the cylinder and the quantity of liquid that is to be carried away and has been replaced by the piston from the pressureless cylinder space, are relatively small. Correspondingly, smaller and less expensive pipe connections, armatures, switching and controlling elements, pumps with a low energy requirement, etc., can be used. On the other hand, the requirement is made that it be possible to produce a high pressure for closing the mold, which results from the piston surface being acted upon and from the pressure of the liquid.

This requirement, therefore, will be met by cylinder spaced with a relatively large cross section and a correspondingly large filling volume as well as by high liquid pressures. But this requires the reversing or repumping of large quantities of liquid and, because of the necessary large cross sections of the pipe lines and because of the high pressures, it requires exceedingly expensive shifting and control elements, pumps, etc. Therefore, the two requirements explained in the preceding paragraph necessitates opposing measures.

In the case of a hydraulic mold closing device for injection molding machines which is customary in most instances and which is of the type mentioned in the beginning, the cylinder spaces located at both sides of the piston are connected with one another as well as with a low pressure line during closing of the mold, so that both the larger piston surface facing away from the piston rod and the other piston surface whose size is reduced the cross section of the piston rod will be acted upon by a low pressure. Consequently, the piston will move toward the end of the cylinder at the side of the piston rod, whereby the liquid displaced by the piston from the cylinder space on the side of the piston rod will flow through the connection of the two cylinder spaces directly into the cylinder space away from the piston rod to which, therefore, additionally, a quantity of oil has been fed from the low pressure line which corresponds to the volume of the piston rod. In this manner, therefore, one can achieve a rapid closing movement with a relatively small quantity of oil from the low pressure pipe and with a relatively low expenditure of energy. When the mold is closed, the connection of the two cylinder spaced will then be interrupted by a control operation, and the cylinder space at the piston rod side will be connected with a drain for the pressure agent, and the other cylinder space will be connected with a high pressure line, so that the piston will be acted upon by a high pressure in order to produce the pressure for the closure of the mold at that of its sides facing away from the piston rod. For this purpose, one will also need only a very small quantity of liquid and a minimum of energy, since the mold is already in its closing position and consequently the thrust of the piston is very small. In the case of opening the mold by means of a renewed reversal, the cylinder space on the side of the piston rod will be connected with a low pressure line and the other cylinder space with a drain for the pressure agent. Therefore, it will be necessary to feed in, on the one hand, the entire liquid volume for the filling of the cylinder space on the side of the piston rod from the low pressure line, while, on the other hand, the entire quantity of liquid drains into the sump of the pump or into a tank from the other cylinder space, so that the opening movement requires a relatively great feed performance of the pump and takes place slowly. If one would want to eliminate this disadvantage, one would have to use larger cross sections of the pipes, considerably more expensive shifting and controlling elements, pumps with a higher performance, higher liquid pressures, etc., and one would have to put up with the disadvantage of this technical expenditure. One can develop the cylinder space surrounding the piston rod small or large in its cross section in relation to the diameter of the piston. If the cylinder space is relatively large, in accordance with the foregoing explanation a higher closing speed and a lower opening speed will be obtained. If the cylinder space is relatively small, then the closing speed is less and the opening speed is higher. If the dimension is selected such that opening and closing speeds are equal to each other, then both movements require the delivery of large quantities of liquid from the pressure agent pipe.

In the case of another mold closing arrangement used frequently, the piston rod and the piston are provided with an axial bore starting out from the side of the piston facing away from the piston rod. In the cylinder space on the side of the piston facing away from the piston rod, a pipe has been arranged fixedly, which projects into the bore of the piston rod and on which the piston and the piston rod glide in a sealed condition during the back-and-forth movement. The cylinder space surrounding the pipe is connected with an oil container arranged above the cylinder via a nonreturn valve. During the closing movement, liquid is conducted through the pipe into the bore of the piston rod from a low pressure line, so that the piston will move in the direction of the end of the cylinder on the side of the piston rod. The displaced liquid flows off from the cylinder space surrounding the piston rod, while the cylinder space surrounding the pipe on the other side of the piston sucks in the liquid from the oil container via the nonreturn valve. This arrangement makes it possible, to be sure, to carry out the closing movement rapidly and with a relatively small expenditure of energy, since only a small quantity of oil is fed to the bore of the piston rod from the low pressure line. The liquid running in without pressure from the oil container into the cylinder arranged below it requires, however, extraordinarily large cross sections of the pipe line and a correspondingly large nonreturn valve in order to fill within the short time the relatively large volume of the cylinder space surrounding the pipe with the quantity of liquid flowing in without pressure and being sucked in by the cylinder space. The following disadvantages are connected therewith. After completion of the closing movement, the cylinder space surrounding the pipe is connected with the high pressure line for the creation of pressure for the closing of the mold, whereby the nonreturn valve closes the connecting line from the cylinder space to the oil container. In consequence of the extremely large cross sections of the pipe and of the high oil pressure, enormous forces become effective in the nonreturn valve and therefore an extraordinarily strong and expensive nonreturn valve will be required, as well as corresponding pipes and armatures. Upon opening the injection mold, the cylinder space surrounding the piston rod is connected with a low pressure line, so that, to be sure, the opening movement can be carried out rapidly and with a small quantity of fed-in pressure liquid, but, in this case too, it will again be necessary to displace large quantities of oil from the cylinder space surrounding the pipe and it must be returned into the oil container. The large cross sections of the pipes as well as the shifting and control elements, and control of the large forces occurring as a result thereof, likewise require very expensive means as will result from the required enormous tank size for the liquid which will make an extraordinarily large construction height of the injection molding machine necessary.

The invention is based on the feature of avoiding the disadvantages of the known installations and of creating a hydraulic mold closing device which will fulfill the requirements mentioned in the beginning in such a manner, that both high molding closing pressures can be produced and that rapid opening and closing movements will become possible even with simple, cheap and reliable technical means, with small quantities of fed-in pressure liquid and with a minimum of expended energy.

According to the invention this object will be solved by the fact, that an outside cylinder with an inside cylinder arranged therein concentrically has been attached to one clamping plate, whereby, a ring-shaped piston has been disposed in the cylinder space which is annular in its cross section and which is formed between the outside cylinder and the inside cylinder. On the one side of said piston, the cylinder space forms a space for the closing pressure and at the other side of the piston a pipe-shaped piston rod has been disposed which is attached to the other clamping plate and which subdivides the part of the cylinder space on the side of the piston rod into an opening pressure space which is ring-shaped in its cross section and into a ring-shaped storage space, and in that the closing pressure space, the opening pressure space and the storage space can be connected with one another by means of control elements, known per se, and are capable of being acted upon the pressure agent and are reversible in such a manner, so that on the first hand for the driving out of the pipe-shaped piston rod during closing of the mold, the closing pressure space, the opening pressure space and the storage space can be connected with one another as well as with a pressure agent supply and the pressure agent which flows off and which is displaced from the opening pressure space and the storage space by the piston is fed directly to the closing pressure space, that on the second hand for the production of the mold closing pressure in the case of a closed mold the closing pressure space can be connected with the pressure agent supply and the opening pressure space as well as the storage space can be connected with a pressure agent drain, and that on the third hand for the driving in of the pipe-shaped piston rod during opening of the mold, the opening pressure space can be connected with a pressure agent supply and the closing pressure space as well as the storage space can be connected with one another as well as with the pressure agent drain, and the pressure agent flowing off and being displaced by the piston from the closing pressure space is conducted directly to the storage space.

In this manner one will achieve that the opening and closing movements are carried out extremely rapidly and with a small expenditure of energy by feeding in small quantities of pressure liquid. The quantities of liquid flowing back and forth merely for the purpose of filling the cylinder spaces are taken from or fed into the storage space, formed within the cylinder itself, under pressure, so that a separate liquid container with the required large volume and the constructional expenditure connected therewith, will be avoided. Although the previously mentioned, relatively large quantities of liquid flow back and forth under pressure, they do not flow through the pumps, so that one can use small pumps with relatively small feed performances. As a result thereof, and as a result of avoiding suction, higher flow speeds become possible and consequently the use of small cross sections in the pipe and armatures can also become possible. Therefore, smaller forces will act upon the shifting and control elements. The mold closing device according to the invention makes possible altogether an extraordinarily economical construction.

The mode of operation of the mold closing installation according to the invention, as well as further characteristics of the invention, will be explained subsequently when considered in connection with the accompanying drawing, in which an embodiment has been presented by way of example and in which;

FIG. 1 is a part longitudinal section and a part side view of the mold closing installation, and FIG. 2 is a diagrammatic view of a switching system for the closing installation according to FIG. 1.

In FIG. 1, a cylinder aggregate 10 has been attached to the support plate 25 of the injection molding machine, which consists of an cylinder 11 and has an inside cylinder 13 arranged concentrically therein. In the cylinder space 6, which is of an annular shape in cross section and which has been formed between the outside cylinder 11 and the inside cylinder 13, an annular piston 12 has been disposed with a pipe-shaped piston rod 14, which has been attached to the movable mold clamping plate 15. On the side of the piston 12 which faces away from the piston rod 14, the cylinder space 6 forms a closing pressure space 4, which during the closing movement is acted upon by the connection 1 in the cylinder cover 18 with pressure liquid. The piston rod 14 subdivides the part of the cylinder space 6 which is on the side of the piston rod into a storage space 7, which is annular in its cross section, as well as into an annular opening pressure space 5 which during the opening movement is acted upon by means of a connection 2 with the pressure liquid. The opening pressure space 5, which is closed by a cylinder cover 17, is disposed in a particularly advantageous manner outside around the piston rod 14, and the storage space 7, which is closed by a cylinder cover 16, has been disposed inside the piston rod 14. This makes possible the following advantageous development of the installation as an especially simple construction method and easy arrangement of the switching and control elements. The inside space of the inside cylinder 13 has been developed as an annular pressure agent pipe or hydraulic fluid transfer passage 21, which, in the case of the embodiment shown by way of example, is located between the inside cylinder 13 and a casing pipe 22, and which is closed at its ends by annular bodies 23 and 24. The pressure agent pipe 21, at its end facing the emergence of the piston rod pipe 14, has been connected by way of an opening 3' with the storage space 7, and has at its other end a connecting opening 3 in that end of the inside cylinder 13 which has been guided out from the outside cylinder 11 by the cylinder cover 18. Piston rings 19 and 20 seal the piston 12 against the outside cylinder 11 and against the inside cylinder 13. In a corresponding manner the cylinder covers 16 and 17 have been provided with gaskets in order to seal the piston rod pipe 14.

The closing pressure space 4, the opening pressure space 5 and the storage space 7 can be connected with one another in the following manner by means of control elements per se, as is to be explained on the basis of a switching diagram shown in FIG. 2, in which the electric lines E1 have been shown in single solid lines and the hydraulic lines H1 in double solid lines. Otherwise the customary symbols are used.

A switch $T_1$ is operated manually or by an automatic system for the purpose of driving out the piston rod pipe 14 during closure of the mold, as a result of which an impulse is sent to the solenoid of the control slide $S_3$, whose right-hand side connects the pressure agent supply 26 from a low pressure source ND by a return valve R with the connection 1 of the closing pressure space 4. Simultaneously, the solenoids of the control slides $S_1$ and $S_2$ have also been energized by operation of the switch $T_1$. The right-hand side of the control slide $S_1$ is interconnected with the connection 2 of the opening pressure space 5 and the right side of the control slide $s_2$ is interconnected with the connection 3 of the storage space 7 with the collecting pipe H1s, which leads in front of the return valve R into the pipe leading to the connection 1. In this manner the closing pressure space 4, the opening pressure space 5 and the storage space 7 are connected with one another and with the pressure agent supply 26, so that the oil, displaced by the piston 12 from the opening pressure space 5 and the storage space 7 and flowing out, is fed to the closing pressure space 4. The quantity of liquid from the low pressure source ND and fed additionally to the closing pressure space 4, therefore corresponds only to such volume defined by the piston rod pipe 14 which has been driven out of cylinder 10 so that the mold closing installation quickly moves into the closing position.

Upon reaching the closing position, a stop 29 of the mold clamping plate 15 operates a terminal switch $E_1$. As a result thereof, the impulse on the control slides $S_1$ and $S_2$ is at first extinguished again, so that they return to their starting position as a result of spring action by means of the springs shown on $S_1$ and $S_2$. $S_2$ by its left side connects the connection 3 of the storage space 7 with the pipe 28 of the pressure agent drain R1, and in the same manner, the left-hand side of $S_1$ connects the connection 2 of the opening pressure space 5 by means of the left side of the control slide $S_4$ with the oil return R1. The terminal switch $E_1$ furthermore provides at the same time a control impulse to the left solenoid of the control slide $S_3$, so that the latter will connect with its left-hand side the line 27 of a high pressure delivery HD by the return valve R with the connection 1 of the closing pressure space 4. As a result thereof and while the mold is closed, the mold closing pressure will be produced. Furthermore, the terminal switch $E_1$ also still energizes the solenoid of the control slide $S_5$, whose right-hand side connects the high pressure pump $P_{HD}$ with the low pressure side of a pressure transmitter U, so that a high pressure will be created by the pump and supported by a pressure storage Sp in the high pressure line HD. This pressure will act upon an adjustable throttle D on an electric contact manometer Ma, which responds at an adjusted mold closing pressure and which wipes out again the impulse given by the terminal switch $E_1$. The control slide $S_3$ therefore will return to its middle rest position, so that the high pressure line 27 will be interrupted. At the same time the return valve R will maintain the pressure in the closing pressure space 4. Furthermore, the control slide $S_5$ returns to its rest position, as a result of which the connection from the high pressure pump $P_{HD}$ to the low pressure side of the pressure transmitter U will be interrupted. Instead of that $S_5$ connects the low pressure side of the pressure transmitter U with the oil return R1, so that the pump acting on the high pressure side of the pressure transmitter will return the differential piston of the pressure transmitter into its starting position. At the same time, the pressure storage Sp is charged up again.

For driving in the pipe 14 of the piston rod during the opening of the mold, the switch $T_2$ is operated either manually or by an automatic system, so that it transmits an impulse to the solenoids of the control slides $S_4$ and $S_2$ as well as of the return valve R which permits flow in both directions. As a result thereof, pipe 26 of the low pressure agent supply ND is connected by the right-hand side of the control slide $S_4$ and by the left side of the control slide $S_1$ with the connection 2 of the opening pressure space 5. By the delivery of a small quantity of oil from the volume of the opening pressure space 5, the piston 12 is moved quickly into the opening position. At the same time, the connection 1 of the closing pressure space 4 is connected by the electrically opened return valve R, the collecting pipe H1s and the right side of the control slide $S_2$ with the connection 3 of the storage space 7, so that the pressure agent displaced by the piston 12 from the closing pressure space 4 and flowing off, is fed directly to the storage space 7. Furthermore, the collecting pipe H1s is connected by the right side of the control slide $S_4$ with the pressure agent drain 28, so that the small excess quantity of oil which corresponds to the volume of the opening pressure space 5 and of the piston rod pipe 14 can flow off into the oil return R1. In the opening position, stop 29 of the mold clamping plate 15 operates a terminal contact $E_2$, which again wipes out the impulse released by the switch $T_2$, so that the control slides $S_4$ and $S_2$ as well as the return valve R will move back into their rest position.

It can be therefore seen that when the electrically operated Valve R (which, it should be noted, may be electrically operated by means of the solenoid shown diagrammatically in connection with valve R in a manner similar to the showing of each solenoid in connection with $S_1$, $S_2$, $S_3$, $S_4$ and $S_5$.) is without any current, as during closure of the mold, the fluid is permitted by Valve R to flow only to the closing pressure space 4. A flow of fluid from the chamber 4 is prevented by the return valve R. However, when the solenoid on valve R receives an electrical impulse, as during opening of the mold, such solenoid will open the return valve R so that fluid is permitted to flow out of the space 4 through the valve R.

I claim:

1. A hydraulic clamping mechanism for an injection moulding machine comprising coaxial outer and inner cylinders, a double acting annular piston disposed in the annular space between the cylinders and operable by relative movement with respect to the cylinders to open and close the mould, one end face of the piston constituting a movable wall of a closing-pressure chamber at one end of the annular space and the other end face of the piston being secured to a tubular piston rod which extends through the other end of the annular space and divides it into an opening-pressure chamber and a storage chamber, and control means operable during a mould-closing operation to connect the closing-pressure chamber, the opening-pressure chamber and the storage chamber with each other and with a first source of hydraulic pressure to effect closure of the mould and displacement of hydraulic fluid from the opening pressure chamber and the storage chamber directly to the closing-pressure chamber, operable during a mold-clamping operation, after the mould has been closed, to connect the closing-pressure chamber to said first source of hydraulic pressure and the opening-pressure chamber and the storage chamber to exhaust, and operable during a mold-clamping operation to connect the opening-pressure chamber with said first source of hydraulic pressure and the closing-pressure chamber and the storage chamber with each other and to exhaust, hydraulic fluid displaced from the closing-pressure chamber being passed directly to the storage chamber.

2. A clamping mechanism according to claim 1, in which the opening-pressure chamber is disposed between the piston rod and the outer cylinder and the storage chamber is disposed between the piston rod and the inner cylinder.

3. A clamping mechanism according to claim 1, in which a hydraulic fluid transfer passage is provided disposed within the inner cylinder, the transfer passage having an outlet at one end and external to the outer cylinder and communicating at the other end with the end of the storage chamber remote from the piston.

4. A clamping mechanism according to claim 1, in which the control means connects the closing-pressure chamber during a mold-clamping operation to a second source of higher pressure than said first source to which it is connected during a mould-closing operation.

UNITED STATES PATENT OFFICE
CERTIFICATE OF CORRECTION

Patent No. 3,596,561           Dated August 3, 1971

Inventor(s) Heinrich Keller

It is certified that error appears in the above-identified patent and that said Letters Patent are hereby corrected as shown below:

Column 6, line 39, substitute --opening-- for "clamping".

Signed and sealed this 18th day of April 1972.

(SEAL)
Attest:

EDWARD M. FLETCHER, JR.           ROBERT GOTTSCHALK
Attesting Officer                   Commissioner of Patents